J. H. PEPPER & J. J. WALKER.
Apparatus for Producing Optical Illusions.

No. 221,605.　　　　　Patented Nov. 11, 1879.

WITNESSES　　　　　　　　　　　　　　　INVENTORS:
　　　　　　　　　By their Attorneys　　John. H. Pepper.
　　　　　　　　　　　　　　　　　　　　James J Walker

UNITED STATES PATENT OFFICE.

JOHN H. PEPPER, OF TUNBRIDGE WELLS, COUNTY OF KENT, AND JAMES J. WALKER, OF NO. 27 FRANCIS STREET, COUNTY OF MIDDLESEX, ENGLAND.

IMPROVEMENT IN APPARATUS FOR PRODUCING OPTICAL ILLUSIONS.

Specification forming part of Letters Patent No. 221,605, dated November 11, 1879; application filed August 5, 1879; patented in England, March 28, 1879.

*To all whom it may concern:*

Be it known that we, JOHN HENRY PEPPER, of No. 16 Calverley Park Crescent, Tunbridge Wells, in the county of Kent, and JAMES JOHN WALKER, of No. 27 Francis Street, in the county of Middlesex, England, have invented new and useful improvements in apparatus to be used in the exhibition of dramatic and other like performances, which improvements are fully set forth in the following specification, reference being had to the accompanying drawings.

The object of our invention is, by a peculiar arrangement of apparatus, to render an actor or object gradually visible or invisible, at will, and also to substitute for an object in sight of the audience the image of another similar object hidden from direct vision without the audience being aware that any such substitution has been made. For this purpose we employ a large mirror—either an ordinary mirror or for some purposes, by preference, a large plate of plate-glass—which is transparent at one end, and more and more densely silvered in passing from this toward the other end. We mount this mirror or plate so that it can, at pleasure, be placed diagonally across the stage or platform. As it advances the glass obscures the view of the actor or object in front of which it passes, and substitutes the reflection of an object in front of the glass, but suitably concealed from the direct view of the audience.

When the two objects or sets of objects thus successively presented to the view are properly placed and sufficiently alike, the audience will be unaware that any change has been made. In some cases, in place of a single sheet of glass, we employ two or more sheets.

In order that our said invention may be most fully understood and readily carried into effect, we will proceed to describe the drawings hereunto annexed.

Figure 2:
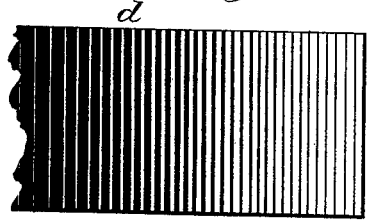
Figure 1:
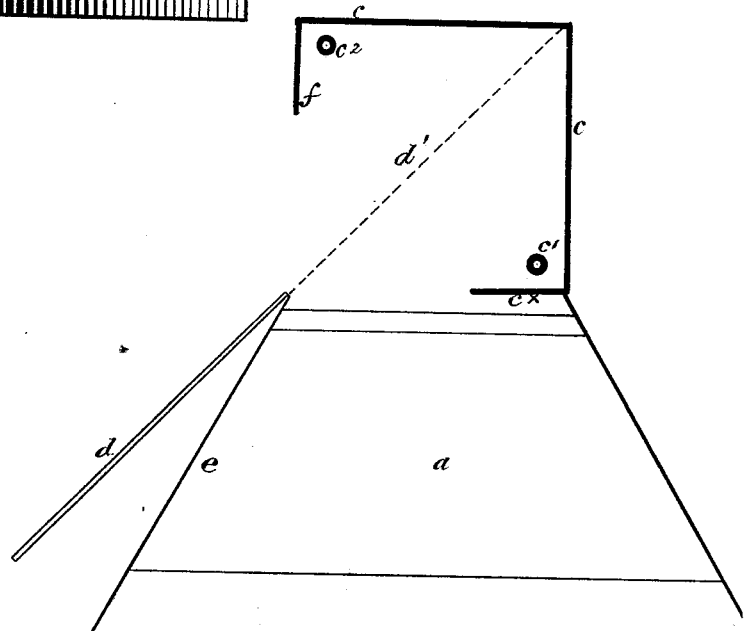
Figure 1:
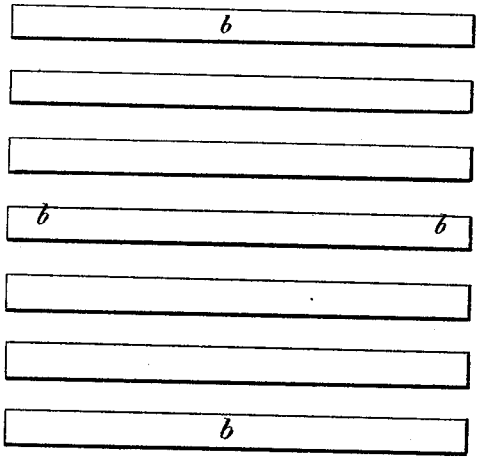

In the drawings, Figure 1 represents a plan view, and Fig. 2 an elevation, of a portion of the mirror, designed to show its graduated opacity.

$a$ is a stage. It may be in a lecture-room or theater. $b\ b$ are the seats for the audience in front of the stage. $c\ c$ is a small room—eight or ten feet square and eight high will often be sufficiently large; but it may be of any size. It may advantageously be raised and approached by two or three steps from the stage $a$.

$d$ is a vertical mirror, passing diagonally across the chamber $c$ and dividing it into two parts, which are exact counterparts the one of the other. The mirror $d$ is so mounted that it can be rapidly and noiselessly moved diagonally across the chamber in the path represented by the dotted line $d'$, and be withdrawn whenever desired. This can conveniently be done by running it in guides and upon rollers to and from a position where it is hidden by a screen, $e$, which limits the view of the audience in this direction.

In consequence of the exact correspondence of the two parts of the chamber $c$, that in front and that behind the mirror, the audience will observe no change in appearance when the mirror is passed across.

The front of the chamber is partially closed at $c^x$ by a shield or short partition-wall, either permanently or whenever required. This is done in order to hide from direct view any object which may be at or about the position $c'$.

The illusions may be performed in various ways—as, for example, an object may, in the sight of the audience, be passed from the stage to the position $c^2$, near the rear short wall or counterpart shield $f$, diagonally opposite to and corresponding with the front corner shield $c^x$, and there be changed for some other. This is done by providing beforehand a dummy at $c'$, closely resembling the object at $c^2$. Then, when the object is in its place, the mirror is passed across without causing any apparent change. The object, when hidden, is changed for another object externally resembling the first, the mirror is withdrawn, and the audience may then be shown in any convenient way that the object now before them differs from that which their eyesight would lead them to suppose it to be.

We prefer, in many cases, not to use an ordinary mirror, $d$, but one of graduated opacity. This may be produced by removing the silvering from the glass in lines; or, if the glass be silvered by chemical deposition, causing the silver to be deposited upon it in lines, somewhat as represented by Fig. 2. Near one side of the glass the lines are made fine and open, and progressively in passing toward the other side they become bolder and closer until a completely-silvered surface is reached. Other means for obtaining a graduated opacity and reflecting power may be resorted to.

By passing such a graduated mirror between the object at $c^2$ and the audience, the object may be made to fade from the sight, or gradually to resolve itself into another form.

What we claim is—

1. In an apparatus for producing optical illusions, the chamber having the counterpart short walls or shields $c^x$ $f$ at its front and rear diagonally-opposite corners, substantially as and for the purpose described.

2. The combination of the chamber, having the counterpart diagonally-opposite corners, and the mirror sliding diagonally in a path between the remaining corners of the chamber, substantially as and for the purpose described.

3. The combination of the chamber $c$, having counterpart diagonally-opposite corners, and the movable mirror $d$, having graduated opacity and reflecting power, substantially as hereinbefore set forth.

J. H. PEPPER.
JAMES J. WALKER.

Witnesses:
JNO. DEAN,
  17 *Gracechurch Street, London, E. C.*
W. B. SKERLEY,
  17 *Gracechurch Street, London, E. C.*